United States Patent
Yoneyama et al.

(10) Patent No.: US 7,517,923 B2
(45) Date of Patent: Apr. 14, 2009

(54) RAW MATERIAL COMPOSITION

(75) Inventors: Aritoshi Yoneyama, Hokkaido (JP); Chizuko Okazaki, Ibaraki (JP); Naoki Mita, Ibaraki (JP); Yutaka Kanai, Ibaraki (JP); Sachi Okazaki, Hokkaido (JP)

(73) Assignee: National Institute of Advanced Industrial Science and Technology, Tokyo (JP)

( * ) Notice: Subject to any disclaimer, the term of this patent is extended or adjusted under 35 U.S.C. 154(b) by 273 days.

(21) Appl. No.: 10/513,700

(22) PCT Filed: May 7, 2003

(86) PCT No.: PCT/JP03/05705

§ 371 (c)(1),
(2), (4) Date: May 24, 2005

(87) PCT Pub. No.: WO03/095553

PCT Pub. Date: Nov. 20, 2003

(65) Prior Publication Data

US 2005/0228082 A1    Oct. 13, 2005

(30) Foreign Application Priority Data

May 7, 2002    (JP)    ............... 2002-131680

(51) Int. Cl.
*C08K 13/02*    (2006.01)
(52) U.S. Cl. ............... 524/9; 524/10; 524/13; 524/425; 524/439; 524/494
(58) Field of Classification Search ............ 524/9–16, 524/27–58, 425–427, 439, 450
See application file for complete search history.

(56) References Cited

U.S. PATENT DOCUMENTS

| 5,661,211 | A | * | 8/1997 | Todd | ............ 524/503 |
| 6,878,378 | B1 | * | 4/2005 | Yamaki et al. | ............ 424/401 |
| 6,953,816 | B2 | * | 10/2005 | Okazaki | ............ 524/27 |
| 2002/0183406 | A1 | * | 12/2002 | Okazaki | ............ 520/1 |
| 2005/0013790 | A1 | * | 1/2005 | Yamaki et al. | ............ 424/74 |

FOREIGN PATENT DOCUMENTS

| JP | 59-179 | A | 1/1984 |
| JP | 2-245040 | A | 9/1990 |
| JP | 4-149110 | A | 5/1992 |
| JP | 4-185771 | A | 7/1992 |
| JP | 2001-131329 | A | 5/2001 |
| JP | 2001-180195 | A | 7/2001 |
| JP | 2002-155231 | A | 5/2002 |
| WO | WO 99/46329 | | 9/1999 |

OTHER PUBLICATIONS

International Search Report, May 24, 2005.

* cited by examiner

*Primary Examiner*—Peter Szekely
(74) *Attorney, Agent, or Firm*—Stephen A. Bent; Foley & Lardner LLP

(57) ABSTRACT

It is provided a raw material composition, having various uses, comprising components (1) to (3) as described below: (1) a composition comprising (a) a polymer component including a homopolymer of vinyl acetate or a partial hydrolysate thereof, or a copolymer of vinyl acetate and one or more monomers selected from a group consisting of acrylic esters, amide acrylate, acrylic acid, methacrylic acid, methacrylic esters, maleic acid, maleic anhydride, and fumaric acid or a partial hydrolysate thereof; (2) a composition comprising one or more compounds selected from a group consisting of silicone compounds, polyvinyl acetate, cetyl methyl cellulose, polyvinyl alcohol, and epoxy resins; and (3) organic or inorganic powder.

3 Claims, No Drawings

RAW MATERIAL COMPOSITION

TECHNICAL FIELD

The present invention relates to a raw material composition having viscosity and plasticity in its wet state and having elasticity in its solidified state, whereby radiation, electromagnetic waves, sounds and the like are adjustably intercepted or generated, and whereby the raw material composition can be molded, processed, and formed into any shape, and further whereby the plasticity and elasticity can be adjusted, for various application purposes.

BACKGROUND ART

There have existed various kinds of elastic raw materials processible to any shape in the past.

Dried powder products, in which ligneous fine powder is blended with sticky substances, are commercially available from SO Co. [1-21-23-201, Ichikawa, Ichikawa-Shi, Chiba-Ken] under the trade name of "Ki no Nendo" (clay of wood). This powder becomes pasty and clayey, after being kneaded with added water and allowed to stand for about one hour. When the molded product is left to stand overnight and then dried, this product solidifies to a certain hardness such as a wood chip. Thus, it is difficult to mold the solidified substance into an intended shape. The solidified substance is breakable if deformation appears therein or impact is given thereto. Further, this substance is deformable when the temperature is increased at a time of drying.

Clay, which is made of soil and commonly used in ceramic arts or the like, is freely molded, however, it takes several days to be dried and solidified. The solidified substance after being dried cannot be molded, so that this substance may be broken due to deformation or impact. This substance also deforms when the temperature is increased at a time of drying. Further, burning of this substance for the purpose of obtaining an enhanced strength may leads to breaking thereof.

Although oil clay used for common handiwork is freely moldable, the oil clay is never dried and solidified, so that this clay remains soft. Thus, it is difficult for the finished product to keep its finished shape, since the molded substance is deformable due to its own weight and is also easily deformable by an external force exerted thereon. Various kinds of paper clay used for common handiwork are freely moldable, but it takes several days until the paper clay is dried and solidified.

It is necessary to pay attention so as to keep the finished shape until the substance will be completely solidified, since the substance is deformable at a time of drying due to its own weight and is also easily deformable by an external force exerted thereon. The solidified substance after being dried cannot easily be molded, so that this substance may be broken due to its deformation or impact.

Although a technique for mixing a synthetic resin with wood chips or small pieces of industrial wastes and then producing a plate or the like with a hot forming machine has been developed by DAIWA HOUSE INDUSTRY Co., Ltd., this technique cannot be applied to a process at normal temperatures. In addition, it is hard to further shape the molded product because of its robustness.

DISCLOSURE OF THE INVENTION

It is an object of the present invention to provide a raw material composition which overcomes defects of the prior art raw material described above, wherein the raw material composition is easily shaped, never broken by an impact or the like, never deformed even at a higher temperature, possible to be quickly dried and solidified, and never divided or cracked after being dried and solidified.

The inventors have overcome the defects of the prior art elastic raw material and devoted ourselves to developing a novel elastic material. Consequently, the inventors have reached the completion of the development by modifying composition of a emulsion composition used for film forming which has been previously developed by the inventors (International Publication WO02/24801), that is, we have now found a novel raw material which can adjustably intercept or generate radiation, electromagnetic waves, sounds and the like, which can easily be molded, processed, and formed into any shape, and which can adjust its plasticity and elasticity.

The raw material composition according to the present invention is a paste having viscosity and plasticity in its wet state, and the degree of viscosity and plasticity can be adjusted by using a compounding ratio of raw materials. Thus, it is easy to handle this raw material composition and is also easy to conduct the molding work.

Although the raw material composition according to the present invention becomes a solid having viscosity and elasticity after being dried, the degree of viscosity and elasticity of this solid is adjustable depending on the compounding ratio of raw materials.

The time required for the raw material composition of the present invention to be dried and solidified is about two to several hours depending on its size when this raw material composition is naturally dried. When this composition is warm-air dried, this composition is quickly dried within about 30 minutes to one hour depending on its size, so that the finished product can immediately be obtained.

The raw material composition of the present invention after being solidified can be shaped by easily shaved with a knife or the like.

If the shaped product is lack in three-dimensional components, another raw material composition whose composition is identical to or different from that of the present invention can easily applied to such portion. In this regard, the prior art raw material, which has additively applied to such portion after being solidified, may easily be come off.

The raw material composition of the present invention is freely molded and shaped, and the degree of such molding and shaping is also adjustable.

The raw material composition of the present invention can intercept the sound and can buffer the impact thereon, and the degree of such interception and buffering is also adjustable.

The raw material composition of the present invention has an ability of intercepting radiation or magnetic field lines, for example, depending on variety of components of the composition in its wet state or in its solidified state, and the degree of such interception is also adjustable.

The raw material composition of the present invention can generate radiation or magnetic field lines, for example, depending on properties of components of this composition, and the strength of such generation is also adjustable.

That is, the present invention is as follows:

[1] a raw material composition comprising components (1) to (3) as described below, (1) (a) a composition comprising a polymer component containing a homopolymer of vinyl acetate or a partial hydrolyzate thereof, or a copolymer of vinyl acetate with at least one monomer selected from the group consisting of acrylic ester, acrylic amide, acrylic acid, methacrylic acid, methacrylic ester, maleic acid, maleic anhydride, and fumaric acid or a partial hydrolyzate thereof, (2) a composition comprising one or more compounds selected from a group consisting of silicone compounds, polyvinyl acetate, cetyl methyl cellulose, polyvinyl alcohol, and epoxy resins, and (3) organic or inorganic powder;

[2] the raw material composition according to [1], comprising a compound in which the composition (1) further comprises (b) a component including one or more members selected from a group consisting of sap, fruit juice, nectar, honey, and saccharide;

[3] the raw material composition according to [2], in which the (b) of the component (1) is sap, and the sap is obtained from one or more members selected from a group consisting of pine, white birch, maple, sugarcane, and sugar beet;

[4] the raw material composition according to [3], in which the (b) of the component (1) is sap from the white birch;

[5] the raw material composition according to any of [1] to [4], in which the composition comprising the silicone compound of the component (2) is a silicone sealant;

[6] the raw material composition according to any of [1] to [5], in which the organic or inorganic powder of the component (3) is one or more members selected from a group consisting of plant fragmented powder, animal fragmented powder, paper fragmented powder, sand, rock powder, mineral powder, bone meal, shell fragmented powder, metal powder, glass powder, synthetic resin powder, and calcium carbonate;

[7] the raw material composition according to [6], in which the powder is white birch fragmented powder;

[8] the raw material composition according to [7], in which the powder is white birch bark fragmented powder;

[9] the raw material composition according to [6], in which the powder is animal dried body fragmented powder;

[10] the raw material composition according to [6], in which the powder is cellulose powder;

[11] the raw material composition according to [6], in which the powder is zeolite;

[12] the raw material composition according to [6], in which the powder is lead;

[13] the raw material composition according to any of [1] to [12], comprising each of the components (1), (2), and (3) in an amount of 5 to 95% by weight;

[14] the raw material composition according to any of [1] to [13], comprising the components (1), (2), and (3) in the amounts of 27 to 76%, 6 to 66%, and 17 to 68% by weight respectively;

[15] a method for producing a raw material composition, comprising mixing components (1) to (3) as described below, (1) (a) a composition comprising a polymer component containing a homopolymer of vinyl acetate or a partial hydrolyzate thereof, or a copolymer of vinyl acetate with at least one monomer selected from the group consisting of acrylic ester, acrylic amide, acrylic acid, methacrylic acid, methacrylic ester, maleic acid, maleic anhydride, and fumaric acid or a partial hydrolyzate thereof, (2) a composition comprising one or more compounds selected from a group consisting of silicone compounds, polyvinyl acetate, cetyl methyl cellulose, polyvinyl alcohol, and epoxy resins, and (3) organic or inorganic powder;

[16] the method for producing the raw material composition according to [15], comprising a compound in which the composition (1) further comprises (b) a component including one or more members selected from a group consisting of sap, fruit juice, nectar, honey, and saccharide;

[17] the method for producing the raw material composition according to [16], in which the (b) of the component (1) is sap, and the sap is obtained from one or more members selected from a group consisting of pine, white birch, maple, sugarcane, and sugar beet;

[18] the method for producing the raw material composition according to [17], in which the (b) of the component (1) is sap from the white birch;

[19] the method for producing the raw material composition according to any of [15] to [18], in which the composition comprising the silicone compound of the component (2) is a silicone sealant; and

[20] the method for producing the raw material composition according to any of [15] to [19], in which the organic or inorganic powder of the component (3) is one or more members selected from a group consisting of plant fragmented powder, animal fragmented powder, paper fragmented powder, sand, rock powder, mineral powder, bone meal, shell fragmented powder, metal powder, glass powder, synthetic resin powder, and calcium carbonate.

Next, the present invention will be described in detail.

1. Composition of Raw Material Composition of the Present Invention

A raw material composition according to the present invention is a polymer composition comprising (1), (2), and (3) described below.

The term "raw material" used herein refers to an unprocessed or a semi processed material to be used as a feed material during a processing step, and this material can be processed into a product having an intended use through means for molding, assembly or the like. The raw material composition refers to a substance to be able to constitute a raw material, containing at least one compound. The raw material composition used herein with the present invention includes a paste or gel comprising a mixture of (1), (2), and (3) described below, and also includes a solidified substance produced by, for example, drying the above described paste or gel.

(1) is a composition comprising a polymer component including a component (a); a homopolymer of vinyl acetate or a partial hydrolyzate thereof, or a copolymer of vinyl acetate with at least one monomer selected from the group consisting of acrylic ester, acrylic amide, acrylic acid, methacrylic acid, methacrylic ester, maleic acid, maleic anhydride, and fumaric acid or a partial hydrolyzate thereof. The (1) may further comprise a compound including a component (b); one or more members selected from a group consisting of sap, fruit juice, nectar, honey, and saccharide.

(2) is a composition comprising one or more compounds selected from a group consisting of silicone compounds, polyvinyl acetate, cetyl methyl cellulose, and polyvinyl alcohol.

(3) is organic or inorganic powder.

The composition according to the present invention may further include a plasticizer, a preserving stabilizer, a filler, a dye, a pigment, a fragrance, a light resistant agent, an oxidation stabilizer or the like. The above described plasticizer, preserving stabilizer, filler, dye, pigment, fragrance, light resistant agent, oxidation stabilizer or the like, which is known to a person skilled in the art, may be mixed with each other depending on its intended use. For example, a product for general purpose use such as phthalic ester including dibutyl phthalate is preferably used as the above described plasticizer.

Mixing of these components provides a preferable raw material composition. Water can be added to this mixture as required.

A polymer component, including a homopolymer of vinyl acetate or a partial hydrolyzate thereof, or a copolymer of vinyl acetate with at least one monomer selected from the group consisting of acrylic ester, acrylic amide, acrylic acid, methacrylic acid, methacrylic ester, maleic acid, maleic anhydride, and fumaric acid or a partial hydrolyzate thereof, is desirably in a state of emulsion. In this regard, a component (a) in a component (1) of the present invention is an aqueous latex emulsion. The latex herein refers to an aqueous dispersion containing polymer or copolymer molecules.

An emulsion containing homopolymers or copolymers of vinyl acetate is commercially available. For example, products as follows which are sold by handicraft shops can be used. The examples are; "Bond for Wood works (produced by Konishi Co., Ltd., an adhesive)", "MOD PODGE (produced by PLAID Co., a finish agent)", "POLEA (produced by PLAID Co., a finish agent)", "SHINE FINISH (produced by Jantee Co. Ltd., a finish agent)", "HALGLOSSHAL (produced by ENTERPRISE Co., a finish agent)", "CLEAR PODGE (produced by AMERICAN HANDICRAFT Co., a finish agent)", "TOP COAT GLOSS (produced by JANTEE Co. Ltd., a finish agent)", Trade Name "TRANSFER COAT (produced by JANTEE Co. Ltd., a transfer agent)", "HAL TRANSFER (produced by HAL ENTERPRISE Co., a transfer agent)", and "SUN FINISH (produced by SAN YOU Co. Ltd., a finish agent)". Therefore, the raw material of the present invention can include one or more of these commercially available products. The product "MOD PODGE" is preferably used among others, and MOD PODGEs whose item numbers according to PLAID Co.'s catalogue are ITEM#CS11222, CS11221, CS11220, CS11219, CS11218, CS11217, CS11213, CS11211, CS11201, CS11202, CS11203, CS11204, CS11205, CS11207, CS11301, CS11302, CS11303 and the like can be used. Also, a latex emulsion described in U.S. Pat. No. 3,616,005 is preferably used.

A homopolymer of vinyl acetate used in the present invention is easily obtained by mixing vinyl acetate monomers with an emulsifier, a polymerization initiator, a catalyst, a protection stabilizer, a plasticizer, and respective additives which have been appropriately diluted, and then subjecting the mixture to emulsion polymerization using the well known conventional method.

A copolymer of vinyl acetate is easily obtained by mixing vinyl acetate monomers with monomers (co-monomers) to be co-polymerized therewith, and then mixing the resultant monomers with an emulsifier, a polymerization initiator, a catalyst, a protection stabilizer, a plasticizer, and respective additives which have been appropriately selected, and then subjecting the resultant mixture to emulsion polymerization using the well known conventional method. In this case, exemplary of the co-monomers are one or more monomers selected from acrylic esters, amide acrylate, acrylic acid, methacrylic acid, methacrylic esters, maleic acid, maleic anhydride, and fumaric acid. Preferable co-monomers among others, considering from a view point of functions that the resultant raw material can easily be molded, processed, or formed into any shape and that the plasticity and elasticity can be adjusted, are one or more monomers selected from a group consisting of acrylic esters, amide acrylate, acrylic acid, methacrylic acid, methacrylic esters, maleic acid, maleic anhydride, and fumaric acid. Exemplary of the more preferable co-monomers are one or more monomers selected from a group consisting of acrylic esters, amide acrylate, acrylic acid, methacrylic acid, methacrylic esters, maleic acid, and maleic anhydride. Exemplary of particularly preferable co-monomers are one or more monomers selected from a group consisting of acrylic esters, amide acrylate, acrylic acid, methacrylic acid, and methacrylic esters.

The above described component (a) per se may contain water, and an example thereof is an aqueous latex containing non-volatile components, which comprises a copolymer including vinyl acetate as a major constituent and dibutyl phthalate or the like as a plasticizer or a stabilizer. Exemplary of such aqueous latex is a composition containing non-volatile components, which comprises a copolymer having vinyl acetate as a major constituent and acrylate as a minor constituent, with which dibutyl phthalate is further mixed.

"Sap" refers to a liquid component from a plant body, and preferably includes sap from pine, white birch, maple, sugarcane, or sugar beet. The sap obtained from each of these plants may be used alone or in combination with one or more others among them. It is also possible to use sap which naturally exudes to a surface of the plant body, and also possible to use sap which has been extracted from the plant through various methods. For the intended uses, a surface of the white birch or the like may be scratched to exude the sap, or alternatively a tube having an appropriate diameter may be inserted to a trunk of white birch or the like to collect a liquid flowing within the plant body, for example. In addition, thus obtained sap can be treated with a filter so as to remove solids, for an intended use. "Sap" as used herein includes any liquid components as long as such components contain a part of constituents of the sap. For example, a white birch sap which is commercially available can be used. Examples of the components of the white birch sap are fructose, glucose, amino acid, malic acid, polysaccharides (quilelane), glycosides (silingareginole), and other minerals. "Sap" used in the present invention also includes an artificial sap produced by artificially mixing the above described components of the sap. The above described components of the white birch sap are examples and may vary depending on regions, seasons or the like.

"Fruit juice" refers to a liquid component from a fruit of a plant, and a liquid component from grapes, peaches, citrus fruits, apples, bananas, watermelons, melons, cherries, pears, pineapples, coconuts, papayas, mangoes, durians or the like can be used. The liquid component from each of these fruits may also be used alone or in combination with one or more others among them. The fruit juice can be obtained by treating the above described fruit with a mixer, for example.

Thus obtained fruit juice may also be used after removing solids therefrom by treating the fruit juice with a filter, for example. "Fruit juice" of the present invention includes any liquid components as long as a part of constituents of the fruit juice is contained therein.

"Honey" refers to a substance stored in a comb which has been spewed out from a bee thereinto. This substance is obtained as follows; that is, nectar which is polysaccharide from nectarines of flower of a plant is absorbed by a stomach (honey sac) of the bee and then degraded into monosaccharide, honey. Honey obtained from one or more of lotus, chestnut, and acacia may be used.

The above described sap, fruit juice, and honey contain water (for example, white birch sap contains about 90 to about 95% of water, and can eventually be diluted with water as appropriate depending on a desired water content to be included in a raw material composition of the present invention, and also the water content can be decreased by concentration.

"Saccharides" include monosaccharide, disaccharide, and polysaccharide, and exemplary thereof are xylitol, sucrose, fructose, glucose, chitosan, chitin, mannan, and guar gum, for example. Each of these saccharides may be used alone or in combination with one or more others among them.

When the component (1) of the raw material composition comprises a compound including a component containing (b) one or more members selected from a group consisting of sap, fruit juice, nectar, honey, and saccharide, a surface of the raw material composition after being solidified becomes smooth, for example.

As the above described component (1) of the raw material composition of the present invention, a film forming emulsion composition described in the International Publication WO02/24801 can be used, for example. This film forming emulsion composition has such component composition that is described in the International Publication WO02/24801, and can be prepared by following the description of the above described publication.

A component including one or more compounds selected from a group consisting of silicone compounds, polyvinyl acetate, cetyl methyl cellulose, polyvinyl alcohol, and an epoxy resin is a gel-like or paste-like component.

As a component of the raw material composition of the present invention, a component which includes a silicone compound is desirable in terms of its characteristic. The silicone compound to be added to the raw material composition of the present invention only needs to be able to provide the raw material composition of the present invention with characteristics such as viscosity, elasticity or the like, and is not limited to a certain silicone compound. However, it is preferable to use a paste-like or gel-like silicone compound. For example, a product which is commercially available as silicone rubber, a silicone resin, a silicone elastomer, or RTV rubber can be used. Also, as a component which includes a silicone compound, it is possible to use a commercially available silicone sealant (a silicone sealing agent) or a silicone caulking material. As a sealant which can be used with the present invention, it is possible to use a material which has a silicone resin of oxime type, acetic acid type, alcohol type, or acetone type as a major component, and further contains a filler, a cross linker or the like. For example, there are a sealant which contains silicone (organopolysiloxane) as a major component, and modified silicone (an organic polymer containing organosiloxsane), both a mono-component system and a two-component system thereof can be used. Silicone in a silicone compound used in the present invention is preferably of a di-functional type having diorganosiloxane ($R_2SiO$) as its building block, or of a tri-functional type having organosilsesquioxane ($RSiO_{1.5}$) as its building block, or a mixture thereof, and further of a tetra-functional type having silicate ($SiO_2$) as its building block. In particular, a silicone compound including the tri- or tetra-functional type of silicone is preferable as a component (2) of the raw material composition of the present invention because of its ability to take the form of a dense three-dimensional network. In addition, it is also possible to preferably use a silicone compound whose basic composition includes $\alpha,\omega$-dihydroxydimethylpolysiloxane having a hydroxyl group at its terminal end and polyfunctional silane as a cross linker.

A composition including the silicone compound used in the raw material composition of the present invention may contain a silica type of reinforcing filler, additive or the like.

For example, it is possible to use Sealant 45, Sealant 4588, Sealant 4515, Sealant Master 300, Otsubo Sealant 40, Pure Sealant (up to this point, an oxime type), Sealant 72 (an alcohol type), KE42, KE420, KE422 (up to this point, an acetic acid type), KE3418 (an acetone type), KE4578, KE4579, KE45, K44, KE4525, KE40RTV, KE4560, KE4576, KE348, KE3490, KE3491, KE3492, KE3493, KE3494, KE4898, KE4890, KE4866, KE4805, KE1830, KE1842, KE119, KE1206, KE66, KE67, KE109, KE1051, KE1052, KE53, KE1204, KE1302, KE1223, KE1861, KE1212, KE1800, KE513, KE521, KE1225, KE10, KE12, KE17, KE20, KE30, KE111, KE112, KE113, KE24, KE26, KE1400, KE1402, KE1404, KE1300, KE1600, KE1603, Sealant 70, Sealant 701, Otsubo Sealant 74, Marine Sealant GX, Sealant 79, Shin-Etsu Silicone M Coat 56, Shin-Etsu Silicone S Coat 57, Shin-Etsu Silicone S Coat 58 or the like, which have been produced by Shin-Etsu Chemical Co., Ltd.

In addition, as a sealant including the commercially available silicone compound, it is possible to use DOW CORNING 732 Multi-Purpose Sealant (its major component is RTV rubber) produced by Dow Corning Co., "Cellulone Sealant" (item number 0927JN) produced by Red Devil Inc., "Kanpe Papio Seal PRO Silicone Sealing Material" (item number 03C003) produced by Kanpe Papio Co., Ltd., "Silicone Sealant Cemedine 8060" (item number C3854Q) produced by Cemedine Co., Ltd., "Cemedine Bathcoke N" (HJ-148) produced by Cemedine Co., Ltd., "Bathcoke Clear CEMEDINE" (item number HJ-133) (its major component is silicone rubber) produced by Cemedine Co., Ltd., a silicone sealant JP-01 (its major component is a de-oxime type of silicone compound) produced by Shin-Etsu Polymer Co., Ltd. or the like, for example. These sealant materials, especially when used for the raw material composition of the present invention, provides favorable characteristics such as viscosity, elasticity, plasticity or the like. It is possible to use a composition including a silicone compound whose characteristics and composition are the same as or similar to the above described sealant materials in order to manufacture the raw material composition of the present invention.

When polyvinyl acetate, cetyl methyl cellulose, polyvinyl alcohol, or epoxy resin is added, these compounds may be added or compositions containing these compounds may also be added. As a composition containing polyvinyl acetate, "Bond for Wood works" (item number 369084) produced by Konishi Co., Ltd. can be exemplified, for example.

The epoxy resin refers to a resinoid material having two or more epoxy groups in a molecule.

Organic or inorganic powder is not limited to certain powder, and exemplary thereof are plant fragmented powder, animal fragmented powder, paper fragmented powder such as cellulose powder, bone meal whose major component is calcium phosphate, shell fragmented powder, sand, rock powder, mineral powder, metal powder, glass powder, synthetic resin powder, calcium carbonate or the like. Examples of the plant fragmented substances are fragmented substances from leaves, stems, and roots of plants including grasses and trees, and for example, powder obtained from finely fragmenting the trunk of tree and the tree bark, and specifically powder obtained from fragmenting the tree bark of white birch. In addition, grain seed powder such as wheat flour can be mixed with the above described substances. These powder is preferably obtained by drying and then fragmenting the plants. Exemplary of the animal fragmented powder is a dried animal body, and a whole of the animal body, a flesh portion of the animal body, a skin portion of the animal body or the like. The example of such powder is obtained by fragmenting the dried marine animals such as starfishes, crabs, shrimps or the like. As for the rock powder, powder obtained by fragmenting fieldstones may be used, or alternatively, powder obtained by fragmenting the cement may also be used. As for the mineral powder, any organic and inorganic mineral substances including metal can be mixed. Exemplary of the mineral substances are mineral pigments such as malachite, cinnabar, turquoise or the like which can be used as a pigment. In addition, quartz powder, talc, mica powder, diatom earth or the like can be used. The Exemplary of the metal powder is powder of noble metal such as gold, platinum, or silver, or alternatively, powder of metal such as iron, copper, zeolite, aluminum, magnetic iron ore, or lead. Exemplary of the synthetic resin powder, whose varieties are not limited, are polyethylene, polypropylene, vinyl chloride, vinylidene chloride, ABS resin, polystyrene, AS resin, methacrylic resin, polyvinyl alcohol, cellulosic plastic, unsaturated polyester resin, polyurethane, polycarbonate, polyvinyl acetate, polyethylene terephthalate, polybutylene terephthalate or the like. Although disposal and recycle of glass, synthetic resins, papers and the like have recently become a problem, these substances can be effectively recycled as resources according to the raw material composition of the present invention. The raw material composition of the present invention can contain two or more powder exemplified herein.

These powder can impart a certain characteristic to the raw material composition of the present invention depending on properties of such powder. For example, tree bark powder provides the raw material composition of the present invention with a certain hardness as well as a color tone, a texture or the like similar to that of trees, so that the raw material composition suitable for building materials can be obtained. Sand, rock powder, mineral powder, or metal powder imparts robustness to the raw material composition of the present invention, and by increasing an amount of the powder to be mixed therewith, the same color or texture as that of the added powder per se can be imparted to this raw material composition. In addition, by mixing the mineral pigment with the raw material composition, a color of the pigment can be imparted to the raw material composition of the present invention. A size of a particle constituting the powder is not limited to a certain level, and it is possible to use a spherical particle whose diameter is several micrometers to several millimeters as appropriate. A method for preparing the powder is not also limited to a certain method, and a suitable method can be selected depending on the powder components. Foaming compounds may be added during producing the raw material composition of the present invention. Addition of such foaming compounds provides the raw material composition having air bubbles therein. Exemplary of the foaming compounds are potassium bicarbonate, sodium bicarbonate and the like.

Further, the raw material composition of the present invention may contain an antibacterial agent or the like.

In addition, the raw material composition of the present invention can develop a color which is the same as that of powder to be mixed therewith, depending on varieties of the powder and a mixing ratio of the powder. However, it is also possible to develop a desired color by mixing another dye, pigment or the like with the raw material composition. For example, a natural dye or artificial dye such as India ink or food red can be added.

2. Method for producing Raw Material Composition of the Present Invention

The raw material composition of the present invention can be produced by mixing the above described components at a specified ratio.

A polymer composition including a component (a) of a component (1) can be produced by mixing water with the (a). For example, a mixing ratio of the component (a) and water is 4 to 8:2 to 4, and preferably 5 to 7:2 4, and more preferably 5 to 7:3 to 4, and most preferably 5 to 7:3 by volume.

A polymer composition including components (a) and (b) of a component (1) can be produced by further mixing water with the (a) and (b). For example, a mixing ratio of the component (a), the component (b), and water is 4 to 8:1:1 to 3, and preferably 5 to 7:1:1 to 3, and more preferably 5 to 7:1:2 to 3, and most preferably 5 to 7:1:2 by volume.

Since water is included in the above described components (1) and (2), an amount of water to be added can eventually be determined by considering a water content of the produced raw material composition of the present invention. In addition, since the water content at a time of producing the raw material composition of the present invention may influence a drying rate or the like of the above described raw material composition, a water content at a time of mixing the components (1) to (3) may be determined depending on the desired drying rates. For example, the water content can be decreased if it is necessary to quickly dry the raw material composition.

In this case, any components can be used as long as composition of the component (a) is as described above, and for example, it is possible to use a composition whose non-volatile component is 55%, and including an aqueous latex of polyvinyl acetate and dibutylphthalate at 80 to 95% by weight and 5 to 20% by weight respectively, and preferably 85 to 95% by weight and 5% to 15% by weight respectively, and more preferably 90 to 95% by weight and 5 to 10% by weight respectively. More specifically, an example of such composition whose non-volatile component is 55% includes 92.5% by weight of an aqueous latex of polyvinyl acetate and 7.5% by weight of dibutylphthalate.

The raw material composition of the present invention preferably comprises each of the components (1) to (3) whose compositions are as described above at 5 to 95% by weight, and more preferably, theses components (1) to (3) are included respectively at 25 to 80% by weight, 5 to 70% by weight, and 15 to 70% by weight. In this case, when the weight of the components (1) is equal to that of the component (2), any kinds of powder can be mixed therewith as the component (3) and provides the raw material composition, after being solidified, with a sufficient strength and favorable elasticity. When the amount of the component (1) to be mixed is larger than that of the component (2), it is possible to obtain a raw material composition whose strength and elasticity are increased. In addition, when the amount of the component (2) to be mixed is larger than that of the component (1), the resultant raw material composition becomes more elastic but less moldable, compared to the case in which the amount of the component (2) is nearly the same as that of the component (1). When cellulose powder or tree bark powder is added as the component (3), elasticity of the raw material composition becomes larger.

The raw material composition of the present invention can be obtained by combining such components at the above described ratio and sufficiently mixing them with each other. The order of mixing these components is not limited, so that the above described component (1) may initially be prepared and then the components (2) and (3) may be added thereto, or alternatively, components included in the above described component (1) and components (2) and (3) may be mixed with each other in random order. When the component (1) is mixed initially, an appropriate amount of water may be mixed with the component (1) as described above. When these components are mixed with each other in random order, an appropriate amount of water may be mixed therewith depending on the eventually required water contents. As a method for mixing these components, a mixer, a spatula or the like is employed as appropriate.

The raw material composition of the present invention thus produced is a paste-like or clayey substance containing a certain amount of water immediately after being produced, so that this material can easily be molded into a desired shape. The raw material composition of the present invention can be quickly dried because of its composition. For example, when the raw material composition of the present invention is shaped into a sphere having a diameter of 1 cm (about 2 grams, this weight may vary depending on the ratio of components), this composition is naturally dried within one or two days, while this composition can also be dried within several hours by using a dryer. The raw material composition of the present invention is never broken, cracked, or split during its drying process. In addition, it is also possible to easily mold this composition into a desired shape even in its drying process.

After being dried, the composition is solidified and has viscosity and elasticity. The viscosity and elasticity can optionally be adjusted by its ratio of components. It is also possible to impart plasticity to this composition after being dried, so that the raw material composition of the present invention after being dried can be molded into a desired shape. The raw material composition of the present invention has elasticity and so this composition does not become harder excessively even after being dried, and also has a non-breakable property, therefore, this composition can easily be formed into a desired shape through severing, cutting, grinding or the like. This composition also has viscosity to a certain degree, and when water is added to this composition after being dried and solidified, this composition can easily recover its characteristic to such level that existed before being dried and solidified. Therefore, even after this composition is dried and solidified, such composition can be molded again by further adding thereto a raw material composition of the present invention which has been obtained before or after being dried and solidified. This means that a plurality of raw material compositions after being dried and solidified can be strongly bound to each other without requiring adhesion means such as an adhesive. Further, a plurality of raw material compositions after being dried and solidified can also be bound to each other by using a raw material composition obtained before being dried and solidified as the adhesion means. That is, the raw material composition of the present invention can obtain again a sufficient plasticity by adding water thereto, even after this composition has been once dried and solidified. Thus, this composition can be reused.

The raw material composition of the present invention before and after being solidified can be evaluated by a sensory test using a tactile sense, a visual sense or the like. A result of the sensory test is referred to herein as a sensory characteristic. For example, several panelists (persons who evaluate by using their tactile senses or the like) touch the raw material composition of the present invention, and can determine and evaluate its hardness, viscosity, tackiness, elasticity and the like according to a certain criterion (for example, a standard raw material having different hardness, viscosity, tackiness, and elasticity is prepared, and then the above described composition of interest is compared to the standard raw material to make an evaluation). Alternatively, a specific measuring device for measuring hardness, viscosity, tackiness, elasticity or the like may also be used. In addition, the elasticity can also be evaluated as follows; that is, the raw material composition of the present invention is formed into a sphere having a certain diameter, and then the sphere is dropped from a certain height onto a surface of a plate having a certain hardness, and then a rebounding height of the sphere is measured, for example.

Exemplary of characteristics which are favorable as the raw material composition of the present invention are as follows. The raw material composition of the present invention preferably has plasticity so as to be easily molded into a desired shape and also has moderate viscosity such that this composition is not stuck and adhered to a hand when this composition is not dried and solidified yet. After this composition is dried and solidified, it is preferable that this composition has moderate elasticity within a range from that of natural rubber to that of hard rubber, for example, and a surface of this composition is never cracked, and is never split or broken even when a shock is given thereto.

3. Method for Using Raw Material Composition of the Present Invention

The raw material composition of the present invention can be solidified by drying thereof.

A mixture before being solidified can be used as a paste-like or clayey substance, and a mixture after being solidified can be used as solids, each of the mixtures being a raw material having moderate viscosity and elasticity. By changing a mixing ratio of the above described components (1) to (3), a hardness of the paste-like composition before being solidified and a viscosity or elasticity of such composition after being solidified can be adjusted. The raw material composition can be freely formed into a desired shape since this composition before being solidified is paste-like, and the raw material composition after being solidified can keep its stable shape. However, it is also possible to allow the raw material composition after being solidified to keep its plasticity by changing the mixing ratio of the components (1) to (3).

The raw material composition of the present invention can be used for manufacturing a female mold from a basic substance and for manufacturing a replica from the female mold. Previously, an original substance was dipped in a liquid silicone resin and solidified for all day and night, and then a rubber-like silicone resin released from the original substance was used as a female mold. A gypsum paste kneaded with water was poured into the female mold and solidified for about 30 minutes, and the gypsum released from the female mold was used as a white gypsum replica. According to a simplified procedure which has recently been reported in a bulletin by Gunma Museum of Natural History, manufacturing a female mold is proposed in which paper clay is used in place of a liquid silicone resin. However, this method is the same as the conventional method in terms of pouring gypsum into the female mold. Thus, contrary to the conventional methods which require different raw materials depending on the intended purposes, the raw material composition of the present invention can be used for each of the male and female molds.

Further, the raw material composition of the present invention can also be used as raw materials for housing, gardening, leisure goods or the like. A raw material having wood-like texture and feeling can be obtained by using tree birch powder as powder to be mixed, and a raw material having natural stone-like texture and feeling can be obtained by using sand or stone powder. When metal powder is used, a raw material having the metal-like texture and feeling can be obtained. In this case, color can also be changed by adding coloring matters, dyes, or pigments to the composition, and translucent colors can also be allowed to develop. Further, this composition can be used as a buffer material because of its viscosity and elasticity after solidification, and also used as a heat insulating material or a sound insulating material.

The raw material composition of the present invention can be provided with various functionalities depending on varieties and combinations of powder to be mixed. For example, a raw material composition having a magnetic force can be obtained by mixing magnetic powder such as magnetic iron ore. In addition, it is possible to obtain a raw material composition which can intercept electromagnetic waves, radiation, sound, light, heat or the like because of powder to be mixed, and its interception degree can easily be regulated by adjusting a mixing ratio of the above described components. For example, the used of lead powder as powder to be mixed provides a raw material composition which can intercept radiations such as α, β, γ rays, and blending of an absorbent such as zeolite as powder provides a raw material composition which can function as a deodorant or air cleaning material. Further, mixing the fragmented powder from animal bodies and plant bodies provides a raw material composition which is effective as a fertilizer. In this case, using this raw material composition, it is possible to manufacture a sand-like or pebble-like product to be mixed with a vessel for growing plants such as a flower pot or a soil for growing plants. When such product is used for growing plants, a fertilizer component within the raw material composition is gradually released from the raw material composition and acts on the plants. In this case, crustaceans such as starfishes, crabs, shrimps or the like which have been dried and fragmented can be used, for example. A large amount of these animal bodies which are often cast upon a shore depending on seasons or regions, has become a problem of contributing to the environmental destruction. However, mixing these animal bodies with the raw material composition of the present invention, such natural wastes can effectively be used. Also, common fertilizers can be mixed to produce the raw material composition of the present invention.

This raw material composition can also be used as a raw material having functionalities as follows, depending on components to be mixed therewith:

thermal raw materials absorbing far infrared rays;

cold insulators blended with calcium chloride or the like (This cold insulator remains soft without becoming harder as with the conventional product, even after the insulator is cooled within a freezer. For example, the insulator which is packed in a flexible vessel or wrapped in a sheet of Saran Wrap so as to take the form of a sealed paste can be used as a packing material of variable shapes having a heat insulating ability. Especially, the material with which the wood fine powder is blended has an excellent durability.);

oxidant cleaning raw materials blended with photocatalysts such as titanium compounds;

materials for intercepting X rays, blended with barium sulfate fine particle;

materials for intercepting magnetic forces, blended with iron fine powder;

materials for intercepting sounds, blended with stone fine powder; and materials for intercepting lights, blended with the above described components.

In addition, since the resultant substance has a magnetic force or radioactivity by blending thereto a substance having a magnetic property or radioactive property, this material is effectively used for a model experiment in which doses and distributions of magnetic force lines or radiations are examined depending on a difference in shapes or magnitudes of radiation sources.

Use of the raw material composition of the present invention having a sufficient flexibility can provide a protective item having a shielding ability which has not been achieved yet and also having an excellent usability.

In addition, the raw material composition of the present invention has additional uses as follows:

electricity accumulation systems in which condensers are freely produced;

plastic or elastic substances blended with manganese dioxide, lead sulfate, carbon, metal, or other powder; and batteries having plasticity, produced by combining the above described electricity accumulation systems with respective raw materials being blended with electrolytes appropriate thereto.

This specification encompasses the content described in a specification and/or drawings of JP Patent Application No. 2002-131680, based on which the priority right to be claimed.

BEST MODE FOR CARRYING OUT THE INVENTION

The present invention will now be specifically described in Examples as follows, however, it is not intended that the present invention is limited to these examples.

EXAMPLE 1

Production of Raw Material Composition of the Present Invention

A component (1) was prepared by mixing MOD PODGE GROSS (produced by PLAID CO., catalogue Item #CS11201), white birch sap, and water at a ratio of 7:1:2 by volume. The white birch sap was tapped through a pipe which was inserted into a hole made on a white birch trunk before April in which the fresh young leaves had come out.

The component (1), the component (2) which is a composition containing a silicone compound ("Bathcoke Clear CEMEDINE" (item number HJ-133) produced by Cemedine Co., Ltd.), and the component (3) were mixed with each other at a weight ratio described in Table 1 in order to prepare raw material compositions. As a contrast of the raw material composition of the present invention, a composition lacking in one or two of the components (1), (2), and (3) or a composition lacking in a component (a) or (b) within the component (1) was prepared and then characteristics thereof were compared to each other. The characteristics were evaluated by a sensory test using a tactile sense and a visual sense.

TABLE 1

Producing of Raw Material Composition

|  | Component (1) | Component (2) | Component (3) |
|---|---|---|---|
| Raw Material Composition 1 of the Present Invention | 6 | 1 | 2 |
| Raw Material Composition 2 of the Present Invention | 10 | 1 | 3 |
| Raw Material Composition 3 of the Present Invention | 2 | 2 | 1 |
| Raw Material Composition 4 of the Present Invention | 1 | 2 | 1 |
| Raw Material Composition 5 of the Present Invention | 1 | 4 | 1.5 |

| | Component (1) | | | |
|---|---|---|---|---|
| | Component (a) | Component (b) | Component (2) | Component (3) |
| Control 1 | 5 | 0 | 1 | 2 |
| Control 2 | 0 | 10 | 1 | 3 |
| Control 3 | 5 | 0 | 0 | 1.5 |
| Control 4 | 0 | 10 | 0 | 3 |

TABLE 1-continued

Producing of Raw Material Composition

Powder from white birch bark was used as Component (3).
Annotations on Respective Compositions based on the Sensory Test

| | |
|---|---|
| Raw Material Composition 1 of the Present Invention | after solidification, rough texture on a surface |
| Raw Material Composition 2 of the Present Invention | after solidification, rough texture on a surface and cracks |
| Raw Material Composition 3 of the Present Invention | after solidification, rough texture on a surface and elasticity |
| Raw Material Composition 4 of the Present Invention | after solidification, glazed surface and elasticity |
| Raw Material Composition 5 of the Present Invention | after solidification, glazed surface, elasticity and viscosity |
| Control 1 | before solidification, sticky; after solidification, rough texture on a surface and cracks |
| Control 2 | before solidification, sticky; after solidification, rough texture on a surface and cracks lacking in consistency and hard to be molded; after solidification, breakable |

TABLE 1-continued

Producing of Raw Material Composition

| | |
|---|---|
| Control 3 | before solidification, sticky and hard to be molded; after solidification, irregular surface |
| Control 4 | before solidification, lacking in consistency and hard to be molded; after solidification, breakable |

The raw material composition of the present invention had an appropriate viscosity before its solidification, but was not so sticky, and so this material was easily shaped. This composition had also an appropriate elasticity after its solidification. Conditions of these surfaces were varied from rough surfaces to glazed surfaces depending on the mixing ratios of respective components. Contrary to this, raw material compositions as controls were highly sticky before being solidified and so easily stuck to hands, or alternatively lacking in viscosity. Any control compositions were hard to be molded.

EXAMPLE 2

Sensory Characteristic of Raw Material Composition of the Present Invention

A component (1) was prepared by mixing MOD PODGE GROSS (produced by PLAID CO., catalogue Item #CS11201), white birch sap, and water at a ratio of 7:1:2 by volume. The white birch sap was tapped through a pipe which was inserted into a hole made on a white birch trunk before April in which the fresh young leaves had come out.

Thus obtained component (1), a composition containing a silicone compound ("Bathcoke Clear CEMEDINE" (item number HJ-133) produced by Cemedine Co., Ltd.), and one or more members from a group consisting of white birch bark powder, lead powder, zeolite powder, and calcium phosphate bone meal were mixed with each other at a weight ratio as described in Table 1 in order to obtain raw material compositions of the present invention.

TABLE 2

Composition of Raw Material Composition

| Raw Material Composition No. | Component (1) | Component (2) | Component (3) | Composition of Component (3) | Sensory Characteristic |
|---|---|---|---|---|---|
| 1-1 | 6 | 1 | 10 | lead powder | loose paste |
| 1-2 | 6 | 1 | 10 | lead powder | paste |
| 1-3 | 6 | 1 | 20 | lead powder | clayey |
| 1-4 | 6 | 1 | 25 | lead powder | harder and brittle |
| 2-1 | 5 | 2 | 3 | white birch bark powder:zeolite powder = 1:2 (by weight) | paste |
| 2-2 | 5 | 2 | 4 | white birch bark powder:zeolite powder = 1:3 (by weight) | clayey |
| 2-3 | 5 | 2 | 4.5 | white birch bark powder:zeolite powder = 1:3.5 (by weight) | harder and brittle |
| 3-1 | 4 | 3 | 1.5 | cellulose powder:calcium phosphate powder = 0.5:1 (by weight) | paste |
| 3-2 | 4 | 3 | 2 | cellulose powder:calcium phosphate powder = 0.5:1.5 (by weight) | clayey |
| 3-3 | 4 | 3 | 2.5 | cellulose powder:calcium phosphate powder = 0.5:2 (by weight) | harder and brittle |
| 4-1 | 6 | 0 | 1 | white birch bark powder | paste |
| 4-2 | 6 | 0 | 2 | white birch bark powder | clayey |
| 4-3 | 6 | 0 | 3 | white birch bark powder | harder and brittle |
| 4-4 | 0 | 6 | 2 | white birch bark powder | paste |
| 4-5 | 0 | 6 | 2.5 | white birch bark powder | clayey |
| 4-6 | 0 | 6 | 3 | white birch bark powder | strongly sticky and hard to be molded |

Numerical values represent weight ratios of Components (1) to (3).

This table also shows sensory characteristics at the time of mixing (before solidification) the respective raw material compositions. The sensory characteristics may vary depending on the mixing ratio of components, so that it is possible to obtain a characteristic appropriate for the intended use of the raw material composition by changing the mixing ratio.

EXAMPLE 3

Drying Characteristic of Raw Material Composition of the Present Invention

A component (1) was prepared as described in Example 2. Thus obtained component (1), a composition containing a silicone compound ("Bathcoke Clear CEMEDINE" (item number HJ-133) produced by Cemedine Co., Ltd.), and one or more members from a group consisting of white birch bark powder, lead powder, zeolite powder, cellulose powder, and calcium phosphate bone meal were mixed with each other at a weight ratio as described in Tables 3 and 4 in order to obtain raw material compositions of the present invention. Thus obtained raw material composition was shaped into a sphere having a diameter of about 1 cm or 1.5 cm (depending on varieties of powders to be mixed, weight of a sphere whose diameter was 1 cm was about 0.5 to 1.5 g and weight of a sphere whose diameter was 1.5 cm was about 2 to 3 g), and then this material was dried by allowing it to stand in an airy place or by directly blowing warm air thereon from a distance of about 45 cm with a home dryer. Weight of the raw material composition was measured by a scale periodically before beginning and during the drying step in order to see the degree of dryness. The results are shown in Tables 3 and 4. Weight was measured during the drying step, and it was decided that the material was completely dried at the time point when its weight was no longer varied.

TABLE 3

Drying Characteristic of Raw Material Composition (1)
Raw Material Composition A-J

| | Raw Material Composition | | | | | | | | | |
|---|---|---|---|---|---|---|---|---|---|---|
| | A | B | C | D | E | F | G | H | I | J |
| Component (1) | 6 | 6 | 6 | 4 | 4 | 4 | 4 | 4 | 4 | 4 |
| Component (2) | 1 | 1 | 1 | 3 | 3 | 3 | 3 | 3 | 3 | 3 |
| Component (3)-1 | 2 | 1 | 1 | 1 | 0.5 | 0.5 | 0.5 | 0.5 | 2.5 | 2.5 |
| Component (3)-2 | | 4 | 4 | | 2 | 2 | 0.5 | 1.5 | | |
| (3)-1 | white birch bark powder | white birch bark powder | white birch bark powder | white birch bark powder | white birch bark powder | white birch bark powder | cellulose powder | cellulose powder | zeolite | calcium phosphate |
| (3)-2 | | zeolite | calcium phosphate | | zeolite | calcium phosphate | white birch bark powder | calcium phosphate | | |
| Diameter (cm) | 1 | 1.2 | 1.3 | 1.7 | 1.8 | 1.6 | 1.7 | 1.7 | 1.5 | 1.5 |
| Drying with Dryer Elapsed Time | | | | | | | | | | |
| 0 min. | 1.227 | 1.04 | 1.205 | 0.651 | 0.43 | 0.705 | 0.544 | 0.725 | 0.733 | 0.972 |
| 10 min. | 1.132 | 0.961 | 1.151 | 0.623 | 0.405 | 0.686 | 0.524 | 0.71 | 0.714 | 0.957 |
| 20 min. | 1.098 | 0.934 | 1.135 | 0.607 | 0.392 | 0.677 | 0.516 | 0.704 | 0.705 | 0.952 |
| 30 min. | 1.067 | 0.909 | 1.119 | 0.591 | 0.385 | 0.669 | 0.506 | 0.698 | 0.701 | 0.947 |
| 40 min. | 1.05 | 0.898 | 1.111 | 0.582 | 0.381 | 0.663 | 0.5 | 0.695 | 0.694 | 0.944 |
| 50 min. | 1.032 | 0.885 | 1.101 | 0.571 | 0.375 | 0.658 | 0.495 | 0.69 | 0.688 | 0.939 |
| 60 min. | 1.02 | 0.875 | 1.094 | 0.563 | 0.372 | 0.654 | 0.49 | 0.687 | 0.686 | 0.937 |
| 9 hrs | 0.926 | 0.828 | 1.044 | 0.498 | 0.337 | 0.601 | 0.442 | 0.643 | 0.64 | 0.893 |
| 21 hrs | 0.85 | 0.785 | 0.976 | 0.482 | 0.325 | 0.571 | 0.418 | 0.614 | 0.612 | 0.86 |
| 22 hrs | nt | nt | nt | nt | nt | nt | nt | nt | nt | nt |
| 36 hrs | 0.812 | 0.771 | 0.941 | 0.478 | 0.322 | 0.554 | 0.406 | 0.596 | 0.593 | 0.838 |
| Natural Drying Elapsed Time | | | | | | | | | | |
| 0 min. | 1.145 | 1.143 | 1.582 | 2.638 | 3.816 | 3.444 | 3.189 | 2.985 | 2.363 | 3.064 |
| 15 min. | 1.116 | 1.117 | 1.55 | nt | nt | nt | nt | nt | nt | nt |
| 30 min. | 1.067 | 1.074 | 1.513 | nt | nt | nt | nt | nt | nt | nt |
| 90 min. | 0.993 | 1.021 | 1.466 | nt | nt | nt | nt | nt | nt | nt |
| 10 hrs | 0.79 | 0.909 | 1.323 | 2.327 | 3.447 | 3.179 | 2.867 | 2.734 | 2.153 | 2.876 |
| 22 hrs | 0.723 | 0.864 | 1.25 | 2.306 | 3.419 | 3.089 | 2.758 | 2.613 | 2.086 | 2.798 |
| 24 hrs | nt | nt | nt | nt | nt | nt | nt | nt | nt | nt |
| 36 hrs | 0.688 | 0.842 | 1.201 | nt | nt | nt | nt | nt | nt | nt |
| 40 hrs | nt | nt | nt | 2.178 | 3.259 | 3.001 | 2.658 | 2.514 | 2.023 | 2.725 |
| 60 hrs | 0.681 | 0.834 | 1.181 | 2.101 | 3.166 | 2.934 | 2.581 | 2.443 | 1.975 | 2.666 |
| 90 hrs | 0.681 | 0.832 | 1.174 | nt | nt | nt | nt | nt | nt | nt |

TABLE 4

Drying Characteristic of Raw Material Composition (2)
Raw Material Composition K-S

| | Raw Material Composition | | | | | | | | |
|---|---|---|---|---|---|---|---|---|---|
| | K | L | M | N | O | P | Q | R | S |
| Component (1) | 2 | 2 | 2 | 6 | 6 | 4 | 4 | 4 | 4 |
| Component (2) | 5 | 5 | 5 | 1 | 1 | 3 | 1 | 1 | 1 |
| Component (3)-1 | 0.5 | 1 | 0.5 | 6 | 7.5 | 0.5 | 0.5 | 0.5 | 0.5 |
| Component (3)-2 | 0.5 | | 0.5 | | | 2 | 3 | 1 | 4.5 |
| (3)-1 | white birch bark powder | white birch bark powder | white birch bark powder | zeolite | calcium phosphate | cellulose powder | cellulose powder | cellulose powder | cellulose powder |

TABLE 4-continued

Drying Characteristic of Raw Material Composition (2)
Raw Material Composition K-S

| | Raw Material Composition | | | | | | | | |
|---|---|---|---|---|---|---|---|---|---|
| | K | L | M | N | O | P | Q | R | S |
| (3)-2 | zeolite | | calcium phosphate | | | zeolite | zeolite | white bark | birch powder | calcium phosphate |
| Diameter (cm) | 1.6 | 1.7 | 1.5 | 1.2 | 1.1 | 1.1 | 1.2 | 1.1 | 1.1 |
| Drying with Dryer Elapsed Time | | | | | | | | | |
| 0 min. | nt | nt | nt | 1.314 | 1.129 | 0.928 | 1.128 | 0.932 | 1.278 |
| 10 min. | nt | nt | nt | 1.267 | 1.112 | 0.912 | 1.179 | 0.894 | 1.237 |
| 20 min. | nt | nt | nt | 1.25 | 1.107 | 0.908 | 1.164 | 0.883 | 1.218 |
| 30 min. | nt | nt | nt | 1.227 | 1.095 | 0.899 | 1.142 | 0.863 | 1.197 |
| 40 min. | nt | nt | nt | 1.208 | 1.087 | 0.891 | 1.125 | 0.851 | 1.18 |
| 50 min. | nt | nt | nt | 1.197 | 1.08 | 0.885 | 1.113 | 0.841 | 1.172 |
| 60 min. | nt | nt | nt | 1.18 | 1.065 | 0.875 | 1.094 | 0.828 | 1.157 |
| 9 hrs | nt | nt | nt | nt | nt | nt | nt | nt | nt |
| 21 hrs | nt | nt | nt | nt | nt | nt | nt | nt | nt |
| 22 hrs | nt | nt | nt | 1.077 | 0.983 | 0.795 | 0.976 | 0.703 | 1.05 |
| 36 hrs | nt | nt | nt | nt | nt | nt | nt | nt | nt |
| Natural Drying Elapsed Time | | | | | | | | | |
| 0 min. | 2.182 | 2.447 | 1.75 | 3.321 | 3.306 | 3.191 | 2.766 | 2.848 | 3.612 |
| 15 min. | nt | nt | nt | nt | nt | nt | nt | nt | nt |
| 30 min. | nt | nt | nt | nt | nt | nt | nt | nt | nt |
| 90 min. | nt | nt | nt | nt | nt | nt | nt | nt | nt |
| 10 hrs | 2.061 | 2.289 | 1.636 | nt | nt | nt | nt | nt | nt |
| 22 hrs | 2.014 | 2.235 | 1.598 | nt | nt | nt | nt | nt | nt |
| 24 hrs | nt | nt | nt | 2.832 | 2.651 | 2.832 | 2.359 | 2.306 | 2.965 |
| 36 hrs | nt | nt | nt | nt | nt | nt | nt | nt | nt |
| 40 hrs | 1.973 | 2.183 | 1.562 | nt | nt | nt | nt | nt | nt |
| 60 hrs | 1.934 | 2.148 | 1.534 | nt | nt | nt | nt | nt | nt |
| 90 hrs | nt | nt | nt | nt | nt | nt | nt | nt | nt |

As shown in Tables 3 and 4, the raw material composition of the present invention after being shaped was solidified within several ten minutes to ten-odd hours in the case of drying thereof with a dryer, and also solidified within several ten hours even in the case of naturally drying thereof, so that this composition can exhibit special characteristics such as practical strength and elasticity.

EXAMPLE 4

Elasticity (Resiliency) of Raw Material Composition of the Present Invention

A component (1) was prepared as described in Example 2. Thus obtained component (1), a composition containing a silicone compound ("Bathcoke Clear CEMEDINE" (item number HJ-133) produced by Cemedine Co., Ltd.), and one or more members from a group consisting of white birch bark powder, lead powder, zeolite powder, cellulose powder, and calcium phosphate bone meal were mixed with each other at a weight ratio as described in Table 3 in order to obtain raw material compositions of the present invention. Thus obtained raw material composition was shaped into spheres having diameters of about 1 cm and 1.5 cm (depending on varieties of powders to be mixed, weight of a sphere whose diameter was 1 cm was about 0.5 to 1.5 g and weight of a sphere whose diameter was 1.5 cm was about 2 to 3 g), and then these materials were dried by allowing them to stand in an airy place. Then, the above described spherical raw material composition was dropped onto a concrete floor from a height of 90 cm, and consequently, the highest level from the floor surface, to which the rebounded spherical material was reached, was measured. Further, a sensory test was conducted so as to obtain elasticity and hardness of the dried spherical raw material composition, which can be perceived by a tactile sense of finger when a pressure was exerted on this composition by the finger. As a contrast, each of the commercially available clay materials were shaped and dried as with the above described raw material composition of the present invention. The commercially available clay materials used herein were Sekifun Nendo (powdered feldspar clay) (trade name) (available from Shinwa Service Co., Ltd.), Fuwafuwa Nendo (fluffy clay) (trade name) (available from Daiso Co., Ltd.), commonly used paper clay (available from Debika Co.), and Tsuchi Nendo (soil clay) (trade name) (available from Daiso Co., Ltd.).

The results are shown in Table 5. Table 5 shows a rebounding height of each of the raw material compositions. The larger the height increases, the larger the elasticity (resiliency) increases. Table 5 also shows results of the sensory test on respective raw material compositions. This sensory test was performed on elasticity using a tactile sense, and the magnitude of elasticity was expressed in "large", "medium", or "small". In this sensory test, the evaluation of "hard" means that the elasticity is extremely small. Further, Table 5 shows weight ratios of respective components of the respective raw material compositions and also shows descriptions of substances to be mixed as Component (3). As for Component (3) prepared by mixing two different components, each of these components is shown as Component (3)-1 or Component (3)-2.

TABLE 5

Elasticity (Resiliency) of Raw Material Composition

| | \multicolumn{13}{c}{Raw Material Composition} |
|---|---|---|---|---|---|---|---|---|---|---|---|---|---|
| | A | B | C | D | E | F | G | H | I | J | K | L | M |
| Component (1) | 6 | 6 | 6 | 4 | 4 | 4 | 4 | 4 | 4 | 4 | 2 | 2 | 2 |
| Component (2) | 1 | 1 | 1 | 3 | 3 | 3 | 3 | 3 | 3 | 3 | 5 | 5 | 5 |
| Component (3)-1 | 2 | 1 | 1 | 1 | 0.5 | 0.5 | 0.5 | 0.5 | 2.5 | 2.5 | 0.5 | 1 | 0.5 |
| Component (3)-2 | | 4 | 4 | | 2 | 2 | 0.5 | 1.5 | | | 0.5 | | 0.5 |
| (3)-1 | white birch bark powder | white birch bark powder | white birch bark powder | white birch bark powder | white birch bark powder | white birch bark powder | cellulose powder | cellulose powder | zeolite | calcium phosphate | white birch bark powder | white birch bark powder | white birch bark powder |
| (3)-2 | | zeolite | calcium phosphate | | zeolite | calcium phosphate | white birch bark powder | calcium phosphate | | | zeolite | | calcium phosphate |
| Diameter (cm) | 1 | 1.2 | 1.3 | 1.7 | 1.8 | 1.6 | 1.7 | 1.7 | 1.5 | 1.5 | 1.6 | 1.7 | 1.5 |
| Rebounding Height (cm) | 21 | 25 | 32 | 17 | 17 | 16 | 13 | 13 | 13 | 14 | 31 | 31 | 24 |
| Sensory Test (Magnitude of Elasticity) | hard | hard | hard | medium | small | small | large | medium | hard | hard | large | medium | medium |

| | \multicolumn{7}{c}{Raw Material} | | | | | | |
|---|---|---|---|---|---|---|---|
| | T Sekifun Nendo | U Fuwafuwa Nendo | V paper clay | W Tsuchi Nendo | X Sekifun Nendo | Y Fuwafuwa Nendo | Z paper clay | AB Tsuchi Nendo |
| Diameter (cm) | 1.2 | 1.1 | 1.2 | 1.2 | 1.7 | 1.6 | 1.6 | 1.5 |
| Rebounding Height (cm) | 15 | 18 | 11 | 8 | 14 | 24 | 12 | 11 |
| Sensory Test (Magnitude of Elasticity) | hard | large | hard | hard | hard | large | hard | hard |

As shown in Table 5, raw material compositions of the present invention having various degrees of elasticity can be obtained based on the weight ratios of respective components to be mixed. Although commercially available powdered feldspar clay (Sekifun Nendo), paper clay, soft clay (Fuwafuwa Nendo) and the like are used as comparative examples for the same investigation, the raw material composition of the present invention can obtain the same characteristics as the respective clays used as the comparative examples, by changing the mixing ratio of the above described components. This means that elasticity of the raw material composition of the present invention can be changed as appropriate by changing the component mixing ratio depending the intended uses. For example, when the raw material composition of the present invention is used as a buffer material, respective components may be mixed with each other at such component ratio that can provide enhanced elasticity.

EXAMPLE 5

Radiation Shielding Test on Raw Material Containing Lead Powder

Respective components were mixed with each other so as to obtain compositions described in 1-3 (weight ratio of lead powder 20%) and 1-4 (weight ratio of lead powder 25%) of Table 2 and in A (mixing white birch bark powder at weight ratio of 2/9) of Table 3, and then the resultant mixture was formed into a plate having a thickness of 2 mm. A schintillation counter detector was located 15 cm from a radiation source ($^{133}$Ba, 356 KeV), and this detector was shielded with a lead block having a thickness of 5 cm which is set in every direction around the detector. In this case, each of the above described plates was set in front of the detector so as to detect radiation only from a forward direction, and then the radiation shielding degrees was measured. The result are shown in Table 6. In Table 6, bg represents a result measured in the absence of the radiation source and in the absence of the shielding material. Blank represents a result measured under the condition that the radiation source is set but the shielding material is not used. Wood represents a raw material composition (A of Table 3) into which white birch bark powder is mixed. Pb20 represents a raw material composition (1-3 of Table 2) into which lead powder has been mixed at a weight ratio of 20%, Pb25 represents a raw material composition (1-4 of Table 2) into which lead powder has been mixed at a weight ratio of 25%, and Pb plate represents a lead plate having a thickness of 2 mm. The unit of numerical values in Table 6 are expressed in µSv/h.

TABLE 6

Radiation Shielding Test on Raw Material Containing Lead Powder

| 1 bag ground | 2 blank | 3 wood | 4 Pb20 | 5 Pb25 | 6 Pb plate (2 mm) |
|---|---|---|---|---|---|
| 20.8 ± 1.6 | 412.3 ± 5.8 | 403.4 ± 8.4 | 297.7 ± 7.2 | 292.4 ± 4.8 | 231.0 ± 5.5 |

As shown in Table 6, wood did not have the effect of shielding radiation, but Pb20 and Pb25 had the shielding effect comparable to a lead plate. The raw material composition of the present invention into which lead powder has been mixed can be freely shaped and has the radiation shielding effect, so that this composition can be used as a raw material composition for radiation protection, for example, by applying it to a wall of a laboratory in which radioactive isotopes are treated or to an outer wear for a person who treats radioactive isotopes.

EXAMPLE 6

Production of Raw Material Composition of the Present Invention Using Various Compounds Including Silicone, Compounds Including Polyvinyl Acetate, Compounds Including Polyvinyl Alcohol, or Epoxy Resin A component (1) was prepared as with Example 2. The obtained component (1) was mixed with a component (2) selected from the following substances and with calcium carbonate powder as a component (3).

Compound used as Component (2)
Compound containing silicone
"Cellulon Sealant" produced by Red Devil Inc., (item number 0927JN)
"Kanpe Papio Seal PRO Silicone Sealing Material" produced by Kanpe Papio Co., Ltd., (item number 03C003)
"Silicone Sealant Cemedine 8060" produced by Cemedine Co., Ltd., (item number C3854Q)
"Cemedine Bathcoke N" produced by Cemedine Co., Ltd., (HJ-148)
Compound containing polyvinyl alcohol
"Fueki O'Glue" produced by Fuekinori Kogyo Co., Ltd., (item number GS5)
Compound containing polyvinyl acetate
"Bond for Wood works" Konishi Co., Ltd., (item number 369084)
"full denture fixing agent, New Liodent Pink" Lion Corp., (item number 12891)
Epoxy resin
epoxy resin of "araldite" produced by Nichiban Co., Ltd., (item number 9082021) ("araldite" is a set of epoxy resin and a curing agent (polyamideamine))

A composition 6 (9) of Example 6 used two components, that is, the above described epoxy resin as Component (2) and "Bathcoke Clear CEMEDINE" used in Example 1.

Mixing amounts of Components (1) to (3) are shown in Table 7.

In addition, though not shown in Table 7, a raw material composition as a comparative example was prepared by mixing only the components (2) and (3) without using the component (1). A mixing ratio of the components (2) and (3) was obtained by excluding the component (1) from the mixing ratio of respective components described in Table 7.

The components were blended at a mixing ratio by which a non-sticky cluster could be obtained when hand-rolled, soft whipped-like material could be obtained, and a paste could be obtained immediately after the mixing as shown in Table 7 (mixing so as to be obtain such whipped-like material was conducted only for some components (2)). When the cluster was obtained immediately after the mixing, the resultant raw material composition became harder after being dried and became stronger. When the whipped-like or paste-like material was obtained immediately after the mixing, the resultant raw material composition became more elastic than the above described cluster after being dried. Table 7 also shows characteristics which were obtained after drying and solidifying the respective raw material compositions (partially, no data collected). When the non-sticky cluster was obtained by hand-rolling immediately after the mixing, the resultant raw material composition became stronger after being dried and solidified. Depending on the intended uses of the raw material composition, it is possible to obtain a raw material composition having desired properties by changing the mixing ratio of components (1) to (3).

When the component (1) was not used, it was difficult to mix the components (2) and (3), and further, the resultant composition was insufficient in its hardness and elasticity. Performance of such composition was extremely lower than that of composition prepared by mixing the components (1) to (3), so that this composition without the component (1) was not suited for the raw material composition of the present invention.

TABLE 7

Producing of Raw Material Composition of the Present Invention
Using Different Components (2)

6(1)

| | | | |
|---|---|---|---|
| Description of paste polymer (Component (2)): | Cellulon Sealant | | |
| Component: | Silicone resin blended aqueous caulking agent (equivalent of denatured silicone caulking agent) | | |
| Importer: | AM Engineering Ltd. (2-7-59, Nishimiyahara, Yodogawa-Ku, Osaka-Shi, TEL: 06-4807-6156) | | |
| Manufacturer: | Red Devil Inc. (Made in the USA by Red Devil, Inc., Union, NJ 07083-1933 Pryor, OK 74361-9510) | | |
| Item number: | 0927 JN | | |
| Condition after kneading | Clustering (not sticky when hand-rolling) | Whipped-like | Paste |
| Condition when solidified | Become harder after drying. Many cracks. Particulate structure on one side. | No data collected | Become harder after drying. Somewhat elastic 10 days after mixing. |
| Component (1) | 2.0(g) | 2.01(g) | 2.00(g) |
| Component (2) | 2.0(g) | 2.03(g) | 2.00(g) |
| Component (3) (CaCO$_3$ powder) | 8.5(g) | 2.01(g) | 3.00(g) |

6(2)

| | | | |
|---|---|---|---|
| Description of paste polymer (Component (2)): | Silicone sealing agent, Papio Seal PRO | | |
| Component: | Silicone admixture | | |
| Manufacturer: | Kanpe Papio Co., Ltd (1-23-20, Esaka-Cho, Suita-Shi, Osaka-Fu, TEL: 0120-167167 URL:http://www.kanpe.co.jp) | | |
| Item number: | 03C003 | | |
| Condition after kneading | Clustering (not sticky when hand-rolling) | Whipped-like | Paste |
| Condition when solidified | Become harder after drying. No cracks and less creases. | No data collected | No data collected |
| Component (1) | 3.00(g) | 3.00(g) | 4.00(g) |
| Component (2) | 1.93(g) | 1.93(g) | 3.00(g) |
| Component (3) (CaCO$_3$ powder) | 11.00(g) | 5.03(g) | 6.00(g) |

6(3)

| | | | |
|---|---|---|---|
| Description of paste polymer (Component (2)): | Silicone Sealant, Cemedine8060 | | |
| Component: | Silicone admixture | | |
| Manufacturer: | Cemedine Co., Ltd. (4-5-9, Higashigotanda, Shinagawa-Ku, Tokyo, 141-8620, TEL: 0120-58-4929) | | |
| Item number: | C3854Q | | |
| Condition after kneading | Clustering (not sticky when hand-rolling) | | Paste |
| Condition when solidified | Become harder after drying. Smooth surface, no cracks, and less creases. | | No data collected |
| Component (1) | 2.00(g) | | 4.00(g) |
| Component (2) | 2.00(g) | | 3.00(g) |
| Component (3) (CaCO$_3$ powder) | 6.50(g) | | 6.00(g) |

6(4)

| | | | |
|---|---|---|---|
| Description of paste polymer (Component (2)): | Bathcoke N | | |
| Component: | High-performance silicone filler | | |
| Manufacturer: | Cemedine Co., Ltd. (4-5-9, Higashigotanda, Shinagawa-Ku, Tokyo, 141-8620, TEL: 0120-58-4929) | | |
| Item number: | HJ-148 | | |
| Condition after kneading | Clustering (not sticky when hand-rolling) | | Paste |
| Condition when solidified | Become harder after drying. Smooth surface, but slightly more creases. | | No data collected |
| Component (1) | 3.00(g) | | 3.00(g) |
| Component (2) | 1.00(g) | | 1.00(g) |
| Component (3) (CaCO$_3$ powder) | 10.05(g) | | 5.00(g) |

6(5)

| | |
|---|---|
| Description of paste polymer (Component (2)): | Fueki O'Glue |

TABLE 7-continued

Producing of Raw Material Composition of the Present Invention
Using Different Components (2)

| | | | |
|---|---|---|---|
| Component: | Polyvinyl alcohol | | |
| Manufacturer: | Fuekinori Kogyo Co., Ltd. | | |
| Item number: | GS5 | | |
| Condition after kneading | Clustering (not sticky when hand-rolling) | | Paste |
| Condition when solidified | Become harder after drying. Scaled creases over the surface, and that is very characteristic. | | Become harder after drying. Somewhat expanded on a surface. |
| Component (1) | 4.00(g) | | 4.00(g) |
| Component (2) | 2.80(g) | | 3.00(g) |
| Component (3) (CaCO$_3$ powder) | 20.05(g) | | 10.00(g) |
| 6(6) | | | |
| Description of paste polymer (Component (2)): | Bond for Wood works | | |
| Component: | Vinyl acetate resin (41%), water (59%) | | |
| Manufacturer: | Konishi Co., Ltd. | | |
| Item number: | 369084 | | |
| Condition after kneading | Clustering (not sticky when hand-rolling) | Whipped-like | Paste |
| Condition when solidified | Become harder after drying. Somewhat creasy on a surface, and shallow cracks. | No data collected | Become harder after drying. Somewhat expanded on a surface. |
| Component (1) | 4.01(g) | 4.00(g) | 4.06(g) |
| Component (2) | 2.80(g) | 2.80(g) | 3.00(g) |
| Component (3) (CaCO$_3$ powder) | 19.00(g) | 8.00(g) | 10.00(g) |
| 6(7) | | | |
| Description of paste polymer (Component (2)): | Araldite (using only epoxy resin contained as a major constituent) | | |
| Component: | Base material: epoxy resin (50%), curing agent: polyamidoamine (50%) | | |
| Distributor: | Nichiban Co., Ltd. (2-3-3, Sekiguchi, Bunkyo-Ku, Tokyo, TEL: 03-5978-5622) | | |
| Manufacturer: | Showa Highpolymer Co., Ltd. (3-20, Kandanishiki-Cho, Chiyoda-Ku, Tokyo) | | |
| Item number: | 9082021 | | |
| Condition after kneading | Clustering (not sticky when hand-rolling) | | Paste |
| Condition when solidified | Considerable elasticity 10 days after the mixing. Shining on a surface. No creases and no cracks. | | Considerable elasticity 10 days after the mixing. Shining on a surface. No creases and no cracks. |
| Component (1) | 2.00(g) | | 2.00(g) |
| Component (2) | 1.50(g) | | 1.00(g) |
| Component (3) (CaCO$_3$ powder) | 2.50(g) | | 1.00(g) |
| 6(8) | | | |
| Description of paste polymer (Component (2)): | Full denture fixing agent, New Liodent Pink | | |
| Component: | Vinyl acetate, ethanol | | |
| Distributor: | Lion Corp. (1-3-7, Honjo, Sumida-Ku, Tokyo, 130-8644, TEL; 03-3621-6611) | | |
| Manufacturer: | Fukuzyu Pharmaceutical Co., Ltd. (zip code 939-8261, TEL: no information) | | |
| Item number: | 12891 | | |
| Condition after kneading | Clustering (not sticky when hand-rolling) | | Paste |
| Condition when solidified | Become harder after drying. The surface is smooth, but has some wrinkles. | | Considerable elasticity at 4/28. Shining on a surface. No creases and no cracks. |
| Component (1) | 2.01(g) | | 2.00(g) |
| Component (2) | 1.50(g) | | 1.00(g) |
| Component (3) (CaCO$_3$ powder) | 8.00(g) | | 1.00(g) |
| 6(9) (using 2 compound as Component (2)) | | | |
| Description of Component (2)-1: | Araldite (using only epoxy resin contained as a major constituent) | | |
| Component: | Base material: epoxy resin (50%), curing agent: polyamidoamine (50%) | | |
| Distributor: | Nichiban Co., Ltd. (2-3-3, Sekiguchi, Bunkyo-Ku, Tokyo, TEL: 03-5978-5622) | | |
| Manufacturer: | Showa Highpolymer Co., Ltd. (3-20, Kandanishiki-Cho, Chiyoda-Ku, Tokyo) | | |
| Item number: | 9082021 | | |
| Condition after kneading | Clustering (not sticky when hand-rolling) | | Paste |

TABLE 7-continued

Producing of Raw Material Composition of the Present Invention Using Different Components (2)

| Condition when solidified | Becomes harder after drying. Rough texture on a surface and somewhat creasy. | Abundance of Elasticity, and smooth surface. Some portions are torn off and fibrous sections can be seen. |
|---|---|---|
| Component (1) | 3.00(g) | 3.00(g) |
| Component (2)-1 | 1.00(g) | 1.00(g) |
| Component (2)-2 | 1.00(g) | 1.00(g) |
| Component (3) (CaCO$_3$ powder) | 5.00(g) | 2.50(g) |

Component (2)-2: Bathcoke Clear CEMEDINE used in Example 1 is used.

EXAMPLE 7

Comparison between Composition Including White Birch Sap as Component (1) and a Composition Without White Birch Sap Although a component including white birch sap was used as Component (1) in each of Examples 1 to 6, a component including water in place of white birch sap was used as Component (1) in Example 7.

A component (1) was prepared by mixing MOD PODGE GROSS (produced by PLAID CO., catalogue Item #CS 11201) and water at a ratio of 7:3 by volume.

As a component (2), "Cemedine Basucoke N" produced by Cemedine Co., Ltd., (HJ-148) was used in Example 7-1 and "DOW CORNING 732 Multi-Purpose Sealant" (2307693-0298) was used in Example 7-2. In addition, calcium carbonate powder was used as a component (3).

As a control, a component (1) was prepared by mixing MOD PODGE GROSS (produced by PLAID CO., catalogue Item #CS 11201), white birch sap, and water at a ratio of 7:1:2 by weight.

Mixing ratios of respective compositions are shown in Table 8. Comparing between a composition into which white birch sap was added and a composition into which white birch sap was not added, the composition into which white birch sap was added provided a raw material composition having a smooth surface. However, even the composition into which white birch sap was not added could be used as a raw material composition.

TABLE 8

Comparison between a composition including white birch sap as Component (1) and a composition without white birch sap

| | | Condition after solidified |
|---|---|---|
| 7(1-1) | | |
| Component (1) Mod Podge:white birch sap:water = 7:2:1 (by volume) | 3.00(g) | Somewhat elastic, and rough surface. |
| Component (2) Basucoke N (Cemetine Co., Ltd., HJ-148) | 2.00(g) | A number of creases and cracks |
| Component (3) CaCO$_3$ | 5.00(g) | |
| 7(1-2) | | |
| Component (1) Mod Podge:water = 7:3 (by volume)) | 3.00(g) | Somewhat elastic, and rough surface. |
| Component (2) Bathcoke N (Cemetine Co., Ltd., HJ-148) | 2.00(g) | A number of creases and cracks |
| Component (3) CaCO$_3$ | 5.00(g) | |
| 7(2-1) | | |
| Component (1) Mod Podge:white birch sap:water = 7:2:1 (by volume) | 2.00(g) | Hardened, and rough surface. |
| Component (2) Dow Corning 732 Multi-Purpose Sealant | 1.50(g) | Many creases, and no smell of acetic acid. |
| Component (3) CaCO$_3$ | 2.00(g) | |
| 7(2-2) | | |
| Component (1) Mod Podge:white birch sap:water = 7:2:1 (by volume) | 2.00(g) | Hardened, and rough surface. |
| Component (2) Dow Corning 732 Multi-Purpose Sealant | 1.50(g) | Many creases, and no smell of acetic acid. |
| Component (3) CaCO$_3$ | 3.75(g) | |
| 7(2-3) | | |
| Component (1) Mod Podge:water = 7:3 (by volume)) | 2.50(g) | Hardened, and rough surface. |
| Component (2) Dow Corning 732 Multi-Purpose Sealant | 1.00(g) | Many creases, and no smell of acetic acid. |
| Component (3) CaCO$_3$ | 3.65(g) | |

Each of the above compositions are clustering immediately after mixing their components (not sticky when hand-rolling).
Dow Corning 732 Multi-Purpose Sealant
Component: silica, amorphouse fumed; #1655/7631869, methyltriacetoxysilane/4253343, ethyltriacetoxysilane/17689779, dimethyl siloxane, hydroxyterminated/70131678
Distributor: Dow Cornning Corporation
Item number: 2307693-0298

INDUSTRIAL APPLICABILITY

As described in Examples, the raw material composition of the present invention is abundant in plasticity and viscosity before being solidified and can be formed into any shape, and further, provides a certain strength (hardness, resistance to breakage, resistance to crazing or the like) and elasticity after being solidified. Thus, the raw material composition can be used for various applications such as housing materials, gardening materials, leisure goods or the like. Since characteristics of the raw material composition of the present invention can be changed as appropriate by changing the mixing ratio of components, raw material compositions having desired characteristics can be obtained depending on their uses.

The entire content of every publication cited herein is incorporated in the present specification. In addition, it will be understood by one of ordinary skill in the art that the present invention can be variously modified and altered without any departure from the scope of the technical idea and the invention described in the appended claims. The present invention is intended to encompass such modification and alteration.

The invention claimed is:

1. A method for producing a raw material composition, comprising mixing components (1) to (4) as described below:
   (1) a composition comprising a polymer component containing a homopolymer of vinyl acetate or a partial hydrolyzate thereof, or a copolymer of vinyl acetate with at least one monomer selected from the group consisting of acrylic ester, acrylic amide, acrylic acid, methacrylic acid, methacrylic ester, maleic acid, maleic anhydride, and fumaric acid, or a partial hydrolyzate thereof;
   (2) a composition comprising one or more compounds selected from the group consisting of a silicone compound, polyvinyl acetate, cetyl methyl cellulose, polyvinyl alcohol, and an epoxy resin;
   (3) an organic or inorganic powder, which is one or more members selected from the group consisting of plant fragmented powder, animal fragmented powder, paper fragmented powder, sand, rock powder, mineral powder, bone meal, shell fragmented powder, metal powder, glass powder, synthetic resin powder, and calcium carbonate; and
   (4) a sap obtained from one or more members selected from the group consisting of pine, white birch, maple, sugarcane, and sugar beet.

2. The method according to claim 1, wherein the sap is obtained from white birch.

3. The method according to claim 1, wherein the silicone compound is a silicone sealant.

* * * * *